(12) United States Patent
Ahn et al.

(10) Patent No.: US 11,952,477 B2
(45) Date of Patent: Apr. 9, 2024

(54) CURABLE COMPOSITION

(71) Applicant: LG Chem, Ltd., Seoul (KR)

(72) Inventors: Sang Bum Ahn, Daejeon (KR); Jin Kyu Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 891 days.

(21) Appl. No.: 16/966,665

(22) PCT Filed: Feb. 7, 2019

(86) PCT No.: PCT/KR2019/001527
§ 371 (c)(1),
(2) Date: Jul. 31, 2020

(87) PCT Pub. No.: WO2019/151844
PCT Pub. Date: Aug. 8, 2019

(65) Prior Publication Data
US 2021/0032433 A1    Feb. 4, 2021

(30) Foreign Application Priority Data

Feb. 2, 2018 (KR) .......................... 10-2018-0013303

(51) Int. Cl.
*G11B 5/702* (2006.01)
*C08K 3/22* (2006.01)
(Continued)

(52) U.S. Cl.
CPC ................. *C08K 3/22* (2013.01); *H02K 3/12* (2013.01); *H02K 3/30* (2013.01); *H02K 15/105* (2013.01); *C08K 2003/2262* (2013.01); *C08K 2003/2272* (2013.01); *C08K 2201/005* (2013.01); *C08K 2201/011* (2013.01); *C08L 63/00* (2013.01); *G11B 5/7026* (2013.01)

(58) Field of Classification Search
CPC ............................. C08L 63/00; G11B 5/7026
See application file for complete search history.

(56) References Cited

U.S. PATENT DOCUMENTS 6,506,531 B1    1/2003  Hakata et al.
8,795,858 B2 *  8/2014  Sato ...................... G11B 5/842
                                              428/840.5
(Continued)

FOREIGN PATENT DOCUMENTS

CN    1753963 A      3/2006
CN    103151134 A    6/2013
(Continued)

OTHER PUBLICATIONS

Extended European Search Report including Written Opinion for Application No. 19747193.1 dated Feb. 23, 2021, pp. 1-8.
(Continued)

*Primary Examiner* — Gary A Nash
(74) *Attorney, Agent, or Firm* — Lerner David LLP (57) ABSTRACT

A curable composition includes a curable resin and a magnetic body, wherein the magnetic body comprises magnetic particles and a surface treatment agent present on a surface of the magnetic particles. The curable composition has low viscosity, and fluidity, and capable of effectively cured without causing curing shrinkage or the like to form a cured product having desired physical properties.

18 Claims, 2 Drawing Sheets

(51) Int. Cl.
      *C08L 63/00*       (2006.01)
      *H02K 3/12*       (2006.01)
      *H02K 3/30*       (2006.01)
      *H02K 15/10*       (2006.01)

(56) References Cited

U.S. PATENT DOCUMENTS

| | | | |
|---|---|---|---|
| 2008/0187783 A1* | 8/2008 | Doi | G11B 5/7334 |
| 2018/0261363 A1 | 9/2018 | Lee et al. | |
| 2018/0273776 A1 | 9/2018 | Ahn et al. | |
| 2019/0040248 A1 | 2/2019 | Ahn et al. | |

FOREIGN PATENT DOCUMENTS

| | | | |
|---|---|---|---|
| JP | H09102409 A | | 4/1997 |
| JP | 2003158842 A | | 5/2003 |
| JP | 2008181162 A | | 8/2008 |
| JP | 2009155690 A | * | 7/2009 |
| JP | 2009155690 A | | 7/2009 |
| JP | 2011259593 A | | 12/2011 |
| KR | 20110025255 A | | 3/2011 |
| KR | 20160114358 A | | 10/2016 |
| KR | 20170113472 A | | 10/2017 |
| WO | 2017052337 A1 | | 3/2017 |
| WO | 2017052339 A1 | | 3/2017 |
| WO | 2017135576 A1 | | 8/2017 |

OTHER PUBLICATIONS

International Search Report for Application No. PCT/KR2019/001527 dated May 15, 2019, 2 pages.

* cited by examiner

CURABLE COMPOSITION

CROSS-REFERENCE TO RELATED APPLICATIONS

The present application is a national phase entry under 35 U.S.C. § 371 of International Application No. PCT/KR2019/001527, filed Feb. 7, 2019, which claims priority to Korean Patent Application No. 10-2018-0013303, filed Feb. 2, 2018, the disclosures of which are incorporated herein by reference.

TECHNICAL FIELD

The present application relates to a curable composition.

BACKGROUND ART

The curable composition can be applied to various applications. For example, the curable composition can be applied to formation of various adhesives or pressure-sensitive adhesives, inks for 3D printing, or formation of engineering plastics, and the like. The curable composition can also be used for forming insulating materials such as insulating coating liquids, insulating coatings for bearings and motors, or insulating sealing agents.

As a method for curing a so-called thermosetting composition that is cured by heat in curable compositions, a method of applying heat from the outside, for example, a method of using hot air or a hot plate has been applied.

However, in the case of the above method, there is a problem that the heat from the outside is not sufficiently transferred to the interior of the composition, thereby causing curing heterogeneity, etc., and when an excessive amount of heat is required for complete curing, there is also a problem that resin damage or the like may occur.

Particularly, in order to introduce the curable composition into a very narrow or complicated shape, it is necessary to secure high fluidity by making the curable composition very low viscosity. In this case, when a known curable composition is applied, the process time becomes long, and the curing degree or filling rate of the curable composition deteriorates even under the long process time, so that there is a limitation in securing the desired performance.

DISCLOSURE

Technical Problem

The present application relates to a curable composition.

Technical Solution

Among physical properties mentioned in this specification, when the measured temperature and/or pressure affects the physical property, the relevant physical property means a physical property measured at room temperature and/or normal pressure, unless otherwise specified.

In the present application, the term room temperature is a natural temperature without warming or cooling, which may mean, for example, any temperature in a range of about 10° C. to 30° C., or a temperature of 25° C. or 23° C. or so. In this specification, unless otherwise specified, the unit of temperature is ° C.

In the present application, the term normal pressure is a pressure at the time of being not pressurized or decompressed, which may be, usually, 1 atmosphere or so, like atmospheric pressure.

The curable composition of the present application comprises a curable resin and a magnetic body. In the curable composition of the present application, the magnetic body is selected so as to be capable of generating heat by a magnetic reversal vibration phenomenon through an external alternating magnetic field. In the curable composition of the present application, the magnetic body is selected to exhibit a suitable degree of dispersion in the curable composition. By this selection, the curable composition can be applied to the curing process even in a state where it has low viscosity, and fluidity depending on the purpose. In addition, in the curing process, the curable composition may be cured at an excellent curing rate while exhibiting small curing shrinkage. Accordingly, in one example, even in a very narrow part and/or a complex-shaped part, the curable composition can form a cured product exhibiting the desired physical properties while effectively filling the part.

In one example, the curable composition may have a viscosity at room temperature of 10,000 cP or less as measured under a condition of a shear rate of 1000. In another example, the viscosity of the curable composition may be 9500 cP or less, 9,000 cP or less, 8500 cP or less, 8,000 cP or less, 7500 cP or less, 7,000 cP or less, 6500 cP or less, 6,000 cP or less, 5500 cP or less, 5,000 cP or less, 4500 cP or less, 4,000 cP or less, 3,000 cP or less, 2,000 cP or less, 1,000 cP or less, 900 cP or less, or 800 cP or less, or may also be 1 cP or more, 2 cP or more, 3 cP or more, 4 cP or more, 5 cP or more, 6 cP or more, 7 cP or more, 8 cP or more, 9 cP or more, 10 cP or more, 15 cP or more, 20 cP or more, 25 cP or more, 30 cP or more, 35 cP or more, 40 cP or more, 45 cP or more, 50 cP or more, 55 cP or more, 60 cP or more, 65 cP or more, 70 cP or more, 75 cP or more, 80 cP or more, 85 cP or more, 90 cP or more, 95 cP or more or 100 cP or more, 1000 cP or more, 1500 cP or more, 2000 cP or more, 2500 cP or more, 3000 cP or more, 3500 cP or more, or 4000 cP or more.

The curable composition of the present application may be an insulating composition. That is, the curable composition may have insulation or may form an insulating cured product after curing. In the present application, the term insulation means a case where the dielectric breakdown strength as determined by ASTM D149 standard is 10 kV/mm or more, 11 kV/mm or more, 12 kV/mm or more, 13 kV/mm or more, 14 kV/mm or more, 15 kV/mm or more, 16 kV/mm or more, 17 kV/mm or more, 18 kV/mm or more, 19 kV/mm or more, or 20 kV/mm or more. Therefore, the curable composition of the present invention in itself can exhibit the above dielectric breakdown strength or can be cured to form a cured product that exhibits the above dielectric breakdown strength. The higher the value of the dielectric breakdown strength, it means that it has more excellent insulation, where the upper limit is not particularly limited, but in one example, it may be about 50 kV/mm or less, 45 kV/mm or less, 40 kV/mm or less, 35 kV/mm or less, 30 kV/mm or less, 25 kV/mm or less, or 20 kV/mm or less. The dielectric breakdown strength is a value measured in accordance with ASTM D149 standard for the curable composition in a film form or a cured product of the curable composition in a film form, and unless otherwise specified, the unit is kV/mm.

The dielectric breakdown strength can be achieved by controlling the kind and/or the ratio of the curable resin and/or the magnetic body, which are components of the curable composition, and for example, can be achieved by applying the following types of components.

The kind of the curable resin that can be included in the curable composition of the present application is not particularly limited. For example, as the curable resin, a so-called thermosetting resin that participates in the curing reaction by application of heat can be applied. In addition, the curable resin is a so-called insulating resin, and a resin capable of exhibiting the above-described insulation (dielectric breakdown strength) before and/or after curing can be applied.

Such a curable resin may have a curable functional group. The curable functional group may be exemplified by an alkenyl group, an acryloyloxy group, a methacryloyloxy group, an acryloyloxyalkyl group, a methacryloyloxyalkyl group, an epoxy group, an oxetane group, an alkenyl group, a hydrogen atom bonded to a silicon atom, an isocyanate group, a hydroxyl group, a phthalonitrile group or a carboxyl group, and the like, but is not limited thereto.

In this specification, the term alkenyl group means an alkenyl group having 2 to 20 carbon atoms, 2 to 16 carbon atoms, 2 to 12 carbon atoms, 2 to 8 carbon atoms or 2 to 4 carbon atoms, unless otherwise specified. The alkenyl group may be linear, branched or cyclic, and may also be optionally substituted by one or more substituents.

In this specification, the term alkyl group means an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be linear, branched, or cyclic, and may also be optionally substituted with one or more substituents.

In this specification, the term epoxy group may mean a monovalent residue derived from cyclic ether having three ring constituent atoms or a compound comprising the cyclic ether, unless otherwise specified. The epoxy group may be exemplified by a glycidyl group, an epoxyalkyl group, a glycidoxyalkyl group or an alicyclic epoxy group, and the like. Here, the alicyclic epoxy group may mean a monovalent residue derived from a compound containing an aliphatic hydrocarbon ring structure and including a structure in which two carbon atoms forming the aliphatic hydrocarbon ring also form an epoxy group. As the alicyclic epoxy group, an alicyclic epoxy group having 6 to 12 carbons may be exemplified, and for example, a 3,4-epoxycyclohexylethyl group and the like may be exemplified.

The specific kind of the curable resin is not particularly limited. For example, in one example of the present application, the curable resin may be a resin having a linear or branched structure comprising the above-described functional group, and specifically, may be exemplified by a polysilicone resin, an imide-based resin such as polyimide, polyether imide or polyester imide, a polyurethane resin, an isocyanate resin, an acrylic resin, a polyester resin, a phthalonitrile resin, polyamic acid, polyamide, polyimide, an acrylic resin, a vinyl-based polymer, an olefin resin or an epoxy resin, and the like, but is not limited thereto.

The magnetic body included in the curable composition can be selected so as to be capable of forming a cured body that can be dispersed with appropriate dispersion in the curable composition and secure the desired physical properties (e.g., insulation).

For example, the magnetic body may be a composite comprising magnetic particles and a surface treatment agent present on the surface of the magnetic particles. By selecting and combining appropriate magnetic particles and/or surface treatment agents, a curable composition suitable for the purpose can be provided.

As the magnetic particles, it may be advantageous to select multi-domain type magnetic particles in which two or more magnetic domains are formed. When the external magnetic field is not present, these magnetic particles are randomly arranged, and when the external magnetic field is applied, they can be magnetized by the direction of the applied magnetic field. Here, the meaning that magnetic domains are randomly arranged may mean a state that the magnetic directions existing in the magnetic domains are each different and are not aligned, and in this case, the net value of magnetization may be substantially close to zero and exist in a state without magnetism. When an external electromagnetic field is applied, magnetization may occur by aligning the magnetic directions of the magnetic domains. Such a magnetic particle may be a super-paramagnetic particle, but is not limited thereto.

It can be usually confirmed through the particle diameter of the magnetic particle whether or not the magnetic particle has a multi-domain.

For example, in the case where the magnetic particle has a particle diameter equal to or larger than the particle diameter $D_s$ satisfying the following equation 1, the magnetic particle can be considered to have a multi-domain.

$$D_s = 2\sqrt{\frac{9A}{\mu_0 M_s^2}\left[\ln\left(\frac{D_s}{a}\right) - 1\right]} \quad \text{[Equation 1]}$$

In Equation 1, $\mu_0$ is a magnetic permittivity constant in vacuum ($1.26 \times 10^{-6}$ H/m), Ms is saturation magnetization (unit: A/m or emu/g) of the magnetic particles, A is exchange stiffness (unit: J/m) of the magnetic particles, and a is a lattice constant (unit m) of the magnetic particles.

In Equation 1, the saturation magnetization, the exchange stiffness and the lattice constant of the magnetic particles except for the magnetic permeability constant are changed according to the specific type of magnetic particles. Therefore, after checking each of the numerical values for the magnetic particles to be applied, the size of the magnetic particles is controlled to the Ds or more obtained by substituting the numerical values into Equation 1, whereby the magnetic particles having multi-domains can be formed.

From the Ds or more usually obtained according to Equation above, the magnetic particles are subjected to multi-domains, and thus, the magnetic particles applied in the present application can have a particle diameter of at least the particle diameter Ds. Here, the upper limit of the particle diameter of the magnetic particles is not particularly limited. Usually, as the particle diameter of the magnetic particles exceeds Ds, coercive force of the corresponding magnetic particles tends to decrease, where the magnetic particles applied in the present application can have a particle diameter within a range capable of having the coercive force to be described below.

When such magnetic particles are applied, the corresponding particles may not be agglomerated and exist in a uniformly dispersed state in the composition because they act similar to absence of magnetism when no external magnetic field is present.

The corresponding magnetic particles do not generate heat by a so-called eddy current or hysteresis loss, but may be selected so that the hysteresis loss of the magnetic particles themselves is small and only the saturation magnetization value is substantially present to be capable of generating vibrational heat. For example, the magnetic particles may be selected so that the magnetic particles are vibrated by the coercive force of the magnetic particles upon application of an external electromagnetic field, thereby generating heat.

The magnetic particle may comprise two or more magnetic domains. The term "magnetic domain" generally means a region in which magnetization directions are differently divided within the magnetic particle. In the present application, magnetic particles having two or more magnetic domains are strongly magnetized by an external alternating magnetic field to generate vibrational heat, and when the magnetic field is eliminated, the magnetic particles return to the original magnetic domains, whereby magnetic particles with low residual magnetization of hysteresis loss can be provided.

In one example, the magnetic particles may have a coercive force in a range of 1 kOe to 200 kOe, 10 kOe to 150 kOe, 20 kOe to 120 kOe, 30 kOe to 100 kOe, 40 kOe to 95 kOe, or 50 kOe to 95 kOe. In another example, the coercive force may be about 10 kOe or more, 15 kOe or more, 20 kOe or more, 25 kOe or more, 30 kOe or more, 35 kOe or more, 40 kOe or more, 45 kOe or more, 50 kOe or more, 55 kOe or more, 60 kOe or more, 65 kOe or more, 70 kOe or more, 75 kOe or more, 80 kOe or more, 85 kOe or more, or 90 kOe or more, or may also be about 190 kOe or less, 180 kOe or less, 170 kOe or less, 160 kOe or less, 150 kOe or less, 140 kOe or less, 130 kOe or less, 120 kOe or less, 110 kOe or less, or 100 kOe or less. The term "coercive force" may mean an intensity of the critical magnetic field required to reduce the magnetization of the magnetic particles to zero. The magnetic particles magnetized by an external magnetic field maintain a certain degree of magnetized state even if a magnetic field is removed, where the intensity of a magnetic field capable of making the magnetization degree to zero by applying a reverse magnetic field to the magnetic particles thus magnetized is referred to as a coercive force. The coercive force of the magnetic particles may be a criterion for distinguishing soft magnetic particles or hard magnetic particles, and the magnetic particles of the present application may be soft magnetic particles. By controlling the coercive force of the magnetic particles in the above range, the present application more easily realizes the magnetization reversal of the magnetic particles to generate vibrational heat to a desired degree in the present application, so that it can satisfy a desired degree of curing physical properties by uniform curing of the resin.

In one example, the magnetic particles may have a saturation magnetization value at room temperature of 20 emu/g to 150 emu/g, 30 emu/g to 130 emu/g, 40 emu/g to 100 emu/g, 50 emu/g to 90 emu/g or 60 emu/g to 85 emu/g. In another example, the saturation magnetization value may be about 20 emu/g or more, 30 emu/g or more, 40 emu/g or more, 50 emu/g or more, 60 emu/g or more, 70 emu/g or more, or 75 emu/g or more, or may also be about 150 emu/g or less, 140 emu/g or less, 130 emu/g or less, 120 emu/g or less, 110 emu/g or less, 100 emu/g or less, or 90 emu/g or less or so. By being capable of controlling the magnetic particles to have a relatively large saturation magnetization value and thus generating heat by vibration between magnetic particles other than eddy currents, the present application can satisfy curing physical properties by uniform curing of the resin. In the present application, the measurement of physical properties of the magnetic particles can be calculated by VSM (vibrating sample magnetometer). The VSM is a device that measures magnetization values of samples by recording the applied magnetic field applied by a Hall probe and recording the electromotive force obtained on applying vibration to the sample by Faraday's law. According to Faraday's law, it can be seen that if the N pole of a bar magnet is directed and pushed towards the coil, the galvanometer moves and the current flows through the coil. The resultant current is called induction current, which was made by induced electromotive force. The VSM is a method of detecting the induced electromotive force, which occurs on vibrating a sample by such a basic operation principle, in the search coil, to measure the magnetization value of the sample by this electromotive force. The magnetic characteristics of a material can be measured simply as functions of magnetic field, temperature and time, and quick measurement in a magnetic force of up to 2 Tesla and a temperature range of 2 K to 1273 K is possible.

In one example, the magnetic particles may have an average particle size in a range of 20 nm to 300 nm, 30 nm to 250 nm, 40 nm to 230 nm, or 45 nm to 220 nm. In another example, the average particle size of the magnetic particles may be about 30 nm or more, 40 nm or more, 50 nm or more, 60 nm or more, 70 nm or more, 80 nm or more, 90 nm or more, or 95 nm or more, or may also be 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, or 110 nm or less or so. The magnetic domains in the magnetic particles may have an average size in a range of 10 nm to 50 nm or 20 nm to 30 nm. The present application can generate heat capable of uniformly curing the resin in the composition by controlling the number of magnetic domains and the magnitude of the coercive force of the magnetic particles to an appropriate range in the particle size range. The present application can generate sufficient vibrational heat on curing through a low coercive force and a large number of magnetic domains by controlling the size of the particles to 20 nm or more, and allow only the saturation magnetization value to be present while reducing hysteresis loss of the magnetic particles themselves, thereby realizing uniform and stable curing by controlling the particle size to 300 nm or less.

The material of the magnetic particles of the present application is not particularly limited as long as it can generate heat through electromagnetic induction heating. In one example, the magnetic particles may be particles represented by Formula 1 below.

$$MX_aO_b \quad \text{[Formula 1]}$$

In Formula 1, M is a metal or a metal oxide, X is Fe, Mn, Co, Ni or Zn, and la X cl=lb X dl is satisfied, where c is the cation charge of X, and d is the anion charge of oxygen. In one example, M may be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c may be +3 and d may be −2. Also, for example, when $X_aO_b$ is $Fe_3O_4$, it can be expressed as $FeOFe_2O_3$, so that c may be +2 and +3, respectively, and d may be −2. The magnetic particles of the present application are not particularly limited as long as they satisfy Formula 1 above, and may be, for example, $MFe_2O_3$.

In one example, the composition of the present application may comprise, as magnetic particles, a compound of Formula 1 above alone, or a mixture of compounds of Formula 1 or a compound doping a compound of Formula 1 with an inorganic substance. The inorganic substance may comprise a monovalent to trivalent cationic metal or an oxide thereof, and two or more of plural cationic metals may be used.

In one example, the magnetic particles may be present in a state where the magnetic particle clusters are formed in the magnetic body. In this case, agglomeration between the magnetic particles is prevented and the dispersibility is improved, whereby the resin can be effectively cured by vibrational heat.

The magnetic particles in the magnetic body may be surface-treated with an appropriate surface treatment agent. The surface treatment can be performed using a compound (surface treatment agent) which can be introduced onto the surface of the magnetic particles. In this specification, the term introduction, anchoring, interaction or bonding used while describing the surface treatment of the magnetic body means a case where a bond is formed between magnetic particles and the surface treatment agent or between the surface treatment agents. Also, here, the bond includes all kinds of bonds known to be capable of linking two components such as a covalent bond, an ion bond, a hydrogen bond, a coordination bond and/or van der Waals binding.

In one example, it is usually known that a compound having a phosphoric acid group, a carboxyl group, a sulfonic acid group, an amino group and/or a cyano group as a functional group can interact with known magnetic particles to form the bonds. Therefore, the magnetic particles may be surface-treated with a substance having such a functional group.

As the compound (surface treatment agent) that can be applied in the present application, a polyol-based compound, a polysiloxane-based compound, an alkyl phosphoric acid-based surface treatment agent (for example, a compound of the following formula A), an alkylcarboxylic acid-based surface treatment agent (for example, a compound of the following formula B), an alkyl sulfonic acid-based surface treatment agent, an acid compound containing other long-chain alkyl groups, an acrylic copolymer containing an acidic functional group or an amino group, an aromatic acid-based surface treatment agent or a block copolymer containing an acidic functional group or an amino group, and the like can be applied.

[Formula A]

[Formula B]

[Formula C]

In Formulas A to C, $R_1$ to $R_3$ are each independently an alkyl group, an arylalkyl group, an alkoxy group or an arylalkoxy group.

The alkyl group or alkoxy group which may be included in Formulas A to C above may be exemplified by an alkyl group or alkoxy group having a carbon number in a range of 6 to 24. Also, in another example, the carbon number of the alkyl group or alkoxy group may be 7 or more, 8 or more, 9 or more, 10 or more, 11 or more, 12 or more, 13 or more, 14 or more, 15 or more, 16 or more, 17 or more, 18 or more, 19 or more, 20 or more, 21 or more, 22 or more, or 23 or more, or may also be 23 or less, 22 or less, 21 or less, 20 or less, 19 or less, 18 or less, 17 or less, 16 or less, 15 or less, 14 or less, 13 or less, 12 or less, 11 or less, 10 or less, 9 or less, 8 or less, or 7 or less or so.

The alkyl group or alkoxy group which may be included in Formulas A to C above may be exemplified by an aryl group having about 6 to 13 carbon atoms, and for example, a benzyl group or a phenyl group, and the like can be applied.

Furthermore, in another example, as the surface treatment agent, (a) a phosphoric acid ester salt of an oligomer or polymer containing an amino group such as a phosphoric acid ester salt of optionally fatty acid-modified or alkoxylated (especially ethoxylated) polyamine, a phosphoric acid ester salt of an epoxide-polyamine adduct, a phosphoric acid ester salt of an acrylate or methacrylate copolymer containing an amino group or a phosphoric acid ester salt of an acrylate-polyamine adduct; (b) a monoester or diester of phosphoric acid such as a monoester or diester of a phosphate having alkyl, aryl, aralkyl or alkylaryl alkoxylate (e.g.: a phosphoric acid monoester or diester of nonylphenol ethoxylate, isotridecyl alcohol ethoxylate or butanol-initiated alkylene oxide polyether) or a monoester or diester of phosphoric acid having a polyester (e.g.: a lactone polyester such as a caprolactone polyester or a caprolactone/valerolactone mixed polyester); (c) an acidic dicarboxy monoester such as an acidic dicarboxy monoester having alkyl, aryl, aralkyl or alkylaryl alkoxylate (especially those of succinic acid, maleic acid or phthalic acid) (e.g.: nonylphenol ethoxylate, isotridecyl alcohol ethoxylate or butanol-initiated alkylene oxide polyether); (d) a polyurethane-polyamine adduct; (e) a polyalkoxylated monoamine or diamine (e.g.: ethoxylated oleylamine or alkoxylated ethylenediamine) or (f) a reaction product of a monoamine, a diamine, a polyamine or an amino alcohol and an unsaturated fatty acid, and a reaction product of unsaturated 1,2-dicarboxylic acids and their anhydrides and their salts and alcohols and/or amines, and the like can also be applied.

Such surface treatment agents are known as commercially available products, and for example, a surface treatment agent known as a product name, such as BYK-220 S, BYK-P 9908, BYK-9076, BYK-9077, BYK-P 104, BYK-P 104 S, BYK-P 105, BYK-W 9010, BYK-W 920, BYK-W 935, BYK-W 940, BYK-W 960, BYK-W 965, BYK-W 966, BYK-W 975, BYK-W 980, BYK-W 990, BYK-W 995, BYK-W 996, BYKUMEN, BYKJET 9131, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, LP-N-21201, LP-N-6918, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-118, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2008, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DIS- PERBYK-2096, DISPERBYK-2150, DISPERBYK-2151, DISPERBYK-2152, DISPERBYK-2155, DISPERBYK-2163, DISPERBYK-2164, DISPERBLAST-1010, DISPERBLAST-1011, DISPERBLAST-1012, DISPERBLAST-1018, DISPERBLAST-I or DISPERBLAST-P (BYK-Chemie, Wesel), can be used.

As the surface treatment agent, a surface treatment agent having an acid value in a range of 10 to 400 mgKOH/g or an amine value in a range of 5 to 400 mgKOH/g may be used for an appropriate surface treatment effect.

In another example, the acid value of the surface treating agent may be about 20 mgKOH/g or more, 30 mgKOH/g or more, 40 mgKOH/g or more, 50 mgKOH/g or more, 60 mgKOH/g or more, 70 mgKOH/g or more, 80 mgKOH/or more, or 90 mgKOH/g or more, or may also be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less or so.

In another example, the amine value of the surface treatment agent may be about 10 mgKOH/g or more, about 15 mgKOH/g or more, about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or may also be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less or so.

In this specification, the term amine value means a value obtained by titrating the amino group (—$NH_2$, —NHR or —$NR_2$) contained in the surface treatment agent with KOH and dividing the resulting value by the KOH consumption (a value in mg of the consumption of KOH titrated per 1 g of the surface treatment agent).

In addition, the acid value means a value obtained by titrating the acid group (—COOH) possessed by the surface treating agent with KOH and dividing the resulting value by the KOH consumption (a value in mg of the consumption of KOH titrated per 1 g of the surface treating agent).

The acid value can be measured by dissolving a sample in a solvent (a mixed solvent of diethyl ether and ethanol at a volume ratio (diethyl ether:ethanol) of 2:1) and using an automatic potentiometric titrator (Mettler, G10S). After the sample is subjected to potentiometric titration with an ethanol solution (potassium hydroxide ethanol solution) in which potassium hydroxide is dissolved to a concentration of about 0.1 mol/L, and the amount of the potassium hydroxide ethanol solution required for neutralizing the sample is measured, the acid value can be calculated through the following equation A.

$$\text{Acid value} = (B \times f \times 5.611)/S \quad [\text{Equation A}]$$

In Equation A, B is the amount (unit:mL) of the potassium hydroxide ethanol solution used in the titration, f is the factor of the 0.1 mol/L potassium hydroxide ethanol solution, and S is the mass (g) of the solid content of the sample.

After a sample is placed in a flask in an amount of about 0.5 g and dissolved with neutralizing acetone and then, the solution is cooled and titrated with 0.1N HCl until the color changes from blue to yellow using a bromophenol blue indicator, the amine value (mgKOH/g) can be obtained through the following equation B.

$$\text{Amine value (mgKOH/g)} = \text{mol } 0.1 \text{ N HCl} \times 100 \times 5.61/\text{sample weight} \times NV \quad [\text{Equation B}]$$

In Equation B above, NV is non-volatile, i.e., a solid content, which can be obtained in the following manner.

After a sample is weighed in an amount of about 0.8 to 1.0 g on a 7.5 cm diameter tin lid, spread evenly, and then dried in an air circulator drying oven at 125° C. for 60 minutes, it can be obtained by the following equation C.

$$\text{NV (unit: \%)} = \text{final weight (weight after drying)}/\text{initial weight (weight before drying)} \times 100 \quad [\text{Equation C}]$$

On the other hand, in order to secure desired physical properties (such as viscosity), it can be appropriate that the surface treating agent which forms bonds with the magnetic particles is a compound having a weight average molecular weight (Mw) of about 20,000 or less. In the present application, the term weight average molecular weight is a standard polystyrene conversion value measured by GPC (gel permeation chromatograph), which may also be simply referred to as molecular weight, unless otherwise specified. In addition, the unit of molecular weight may be g/mol.

In another example, the molecular weight of the surface treatment agent may be about 19,000 or less, 18,000 or less, 17,000 or less, 16,000 or less, 15,000 or less, 14,000 or less, 13,000 or less, 12,000 or less, 11,000 or less, 10,000 or less, 9,000 or less, 8,000 or less, 7,000 or less, 6,000 or less, 5,000 or less, 4,000 or less, 3,000 or less, 2,000 or less, or 1,000 or less, or may also be 100 or more, 200 or more, 300 or more, 400 or more, 500 or more, 600 or more, 700 or more, 800 or more, 900 or more, or 1,000 or more.

In the present application, the magnetic body can be formed by applying a method of interacting the functional group with magnetic particles when the functional group, that is, a phosphoric acid group, a carboxyl group, a sulfonic acid group, an amino group and/or a cyano group is present in the compound, or by introducing the functional group into the compound by a known chemical method and then interacting with the magnetic particles when the compound does not have the functional group.

In the magnetic body, the surface treatment agent may be included in a ratio of about 0.1 to 30 parts by weight relative to 100 parts by weight of the magnetic particles. Under such a ratio, a magnetic body having a desired performance can be obtained. In this specification, the unit "part by weight" means a weight ratio between the respective components, unless otherwise specified. In another example, the ratio may be about 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by or more, or 5 parts by weight or more, or may also be about 25 parts by weight or less, 20 parts by weight or less, 15 parts by weight or less, or 10 parts by weight or less or so.

There is no particular limitation on the manner of obtaining the magnetic body by surface-treating the magnetic particles with the surface treatment agent. For example, by mixing the magnetic particles and the surface treatment agent under an appropriate environment such as a solvent, it is possible to induce the interaction between the magnetic particles and the surface treatment agent, thereby forming the above-described bond. Such a surface treatment agent may be present around the magnetic particles.

The magnetic particles may be further surface-treated. In this case, the above-mentioned surface treatment agent may be referred to as a primary surface treatment agent, and the surface treatment agent used for the additional surface treatment may be referred to as a secondary surface treatment agent. Therefore, in one example, the magnetic body may further comprise a secondary surface treatment agent forming bonds with the surface treatment agent (primary surface treatment agent) or the magnetic particles.

As the secondary surface treatment agent, a polymer compound can be used, and for example, a polymer compound having a molecular weight (Mw) in a range of about 1,000 to 500,000 can be applied. In another example, the molecular weight (Mw) may be about 1500 or more, 2000 or more, 2500 or more, 3000 or more, 3500 or more, 4000 or more, 4500 or more, 5000 or more, 5500 or more, 6000 or more, 6500 or more, 7000 or more, 7500 or more, 8000 or more, 8500 or more, 9000 or more, 9500 or more, 10000 or more, 12000 or more, 14000 or more, 16000 or more, 18000 or more, 19000 or more, or 20000 or more, or may also be 450000 or less, 400000 or less, 350000 or less, 300000 or less, 250000 or less, 200000 or less, 150000 or less, 100000 or less, 90000 or less, 80000 or less, 70000 or less, 60,000 or less, 50000 or less, 40000 or less, 30000 or less, or 25000 or less or so.

The polymer compound that can be used as the secondary surface treatment agent can be exemplified by polyurethane, polyurea, poly(urethane-urea) and/or polyester, and the like. For the above-mentioned polymer compound, a compound containing a functional group interacting with the primary surface treatment agent and/or the magnetic particles is selected and used, or if the functional group is not contained, such a functional group is introduced and applied, whereby the surface treatment can be performed.

The polymer compound used as the secondary surface treatment agent may have a functional group interacting with the primary surface treatment agent and/or the magnetic particles, and such a functional group may be exemplified by a phosphoric acid group, a carboxyl group, a sulfonic acid group, an amino group and/or a cyano group, and the like, which are described above, or a secondary or tertiary amine group or amino group ($-NH_2$, $-NHR$ or $-NR_2$ and the like), or a urea bond and the like, but is not limited thereto.

In one example, as the secondary surface treatment agent, a polymer comprising a urea unit and/or a urethane unit may be applied.

Here, the urea unit may be represented by the following formula 1, and the urethane unit may be represented by the following formula 2.

[Formula 1]

In Formula 1, $R_4$ to $R_7$ are each independently a hydrogen atom or an alkyl group, and $L_1$ and $L_2$ are each independently an aliphatic, alicyclic or aromatic divalent residue.

[Formula 2]

In Formula 2, $R_8$ and $R_9$ are each independently a hydrogen atom or an alkyl group, and $L_3$ and $L_4$ are each independently an aliphatic, alicyclic or aromatic divalent residue.

The unit of Formula 1 is a so-called urea unit, which can be formed by reacting a polyamine and a diisocyanate compound. Thus, for example, in Formula 1 above, $L_1$ may be a structure derived from a diisocyanate compound participating in the reaction, and $L_2$ may be a structure derived from a polyamine participating in the reaction. Here, the derived structure is, in the case of $L_1$, the structure excluding the isocyanate group in the diisocyanate compound, and in the case of $L_2$, the structure of the part excluding the amine group ($-NH_2$) in the polyamine compound.

On the other hand, the unit of Formula 2 is a so-called urethane unit, which can be formed by reacting a polyol and a diisocyanate compound. Thus, for example, in Formula 2 above, $L_3$ may be a structure derived from a diisocyanate compound participating in the reaction, and $L_4$ may be a structure derived from a polyol participating in the reaction. Here, the derived structure is, in the case of $L_3$, the structure excluding the isocyanate group in the diisocyanate compound, and in the case of $L_4$, the structure of the part excluding the hydroxyl group ($-NH_2$) in the polyol compound.

The diisocyanate compound capable of forming the structures of Formulas 1 and 2 may be exemplified by tolylene diisocyanate, xylene diisocyanate, diphenylmethane diisocyanate, hexamethylene diisocyanate, isoboron diisocyanate, tetramethylxylene diisocyanate or naphthalene Diisocyanate, and the like, but is not limited thereto.

Also, the polyamine capable of forming the structure of Formula 1 may be exemplified by an alkylenediamine having an alkylene unit with 1 to 20 carbon atoms, 1 to 16 carbon atoms, 1 to 12 carbon atoms, 1 to 8 carbon atoms or 1 to 4 carbon atoms, such as ethylenediamine or propylenediamine, but is not limited thereto.

Furthermore, the polyol capable of forming the structure of Formula 2 may be exemplified by an alkylene glycol having an alkylene unit with 1 to 20 carbon atoms, 1 to 16 carbon atoms, 1 to 12 carbon atoms, 1 to 8 carbon atoms or 1 to 4 carbon atoms, such as ethylene glycol or propylene glycol, but is not limited thereto.

Therefore, polyurethane and/or polyurea or poly(urethane-urea), and the like, which are applied by suitably combining the known monomers as above, can be used as the secondary surface treatment agent, and if necessary, the polyurethane and/or polyurea or poly(urethane-urea), and the like can be applied after introducing the necessary functional group thereto by a known chemical method.

As the secondary surface treatment agent, a compound having an acid value and/or an amine value may be used depending on the type of the curable resin, or other compounds may be applied. Thus, in one example, the secondary surface treatment agent may have an acid value in the range of 10 to 400 mgKOH/g, or an amine value in the range of 5 to 400 mgKOH/g.

In another example, the acid value of the surface treating agent may be about 20 mgKOH/g or more, 30 mgKOH/g or more, 40 mgKOH/g or more, 50 mgKOH/g or more, 60 mgKOH/g or more, 70 mgKOH/g or more, 80 mgKOH/or more, or 90 mgKOH/g or more, or may also be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less, 90 mgKOH/g or less, 80 mgKOH/g or less, 70 mgKOH/g or less, 60 mgKOH/g or less, 50 mgKOH/g or less, 40 mgKOH/g or less, or 30 mgKOH/g or less or so.

In another example, the amine value of the surface treatment agent may be about 10 mgKOH/g or more, about 15 mgKOH/g or more, about 20 mgKOH/g or more, 30 mgKOH/g or more, 40 mgKOH/g or more, 50 mgKOH/g or more, 60 mgKOH/g or more, 70 mgKOH/g or more, 80 mgKOH/g or more, or 90 mgKOH/g or more, or may also be about 390 mgKOH/g or less, 380 mgKOH/g or less, 370 mgKOH/g or less, 360 mgKOH/g or less, 350 mgKOH/g or less, 340 mgKOH/g or less, 330 mgKOH/g or less, 320 mgKOH/g or less, 310 mgKOH/g or less, 300 mgKOH/g or less, 290 mgKOH/g or less, 280 mgKOH/g or less, 270 mgKOH/g or less, 260 mgKOH/g or less, 250 mgKOH/g or less, 240 mgKOH/g or less, 230 mgKOH/g or less, 220 mgKOH/g or less, 210 mgKOH/g or less, 200 mgKOH/g or less, 190 mgKOH/g or less, 180 mgKOH/g or less, 170 mgKOH/g or less, 160 mgKOH/g or less, 150 mgKOH/g or less, 140 mgKOH/g or less, 130 mgKOH/g or less, 120 mgKOH/g or less, 110 mgKOH/g or less, or 100 mgKOH/g or less, 90 mgKOH/g or less, 80 mgKOH/g, 70 mgKOH/g, 60 mgKOH/g or less, 50 mgKOH/g or less, 40 mgKOH/g or less, or 30 mgKOH/g or less or so.

In another example, the secondary surface treatment agent may be a compound having no acid value and/or amine value. In the present application, no acid value or amine value means a case where the acid value or amine value is about 5 mgKOH/g or less, 4 mgKOH/g or less, 3 mgKOH/g or less, 2 mgKOH/g or less, 1 mgKOH/g or less, or 0.5 mgKOH/g or less, or substantially 0 mgKOH/g.

As such, the surface treatment agent having no acid value and/or amine value is particularly effective when the curable resin is an epoxy resin or the like.

Such a surface treatment agent includes a branched polyester surface treatment agent known as a so-called branched polyester-based dispersant.

As the secondary surface treatment agent, a polymer compound can be applied, and for example, a polymer compound having a larger molecular weight than that of the primary surface treatment agent can be used. In this case, the molecular weight (Mw) of the secondary surface treatment agent may be, for example, in the range of about 10,000 to 500,000. Such a secondary surface treatment agent is particularly effective when an epoxy resin is applied as the curable resin.

In the magnetic body, the secondary surface treatment agent may be included in a ratio of about 0.01 to 30 parts by weight relative to 100 parts by weight of the magnetic particles. Under such a ratio, a magnetic body having a desired performance can be obtained. In another example, the ratio may be about 0.5 parts by weight or more, 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, or 5 parts by weight or more, or may also be about 25 parts by weight or less, 20 parts by weight or less, 15 parts by weight or less, about 13 parts by weight or less, about 12 parts by weight or less, or about 10 parts by weight or less or so.

The method of surface-treating magnetic particles with the secondary surface treatment agent is not particularly limited. For example, the magnetic body may be prepared by mixing the magnetic particles (or the magnetic particles treated with the primary surface treatment agent) and the secondary surface treatment agent in an appropriate environment such as a solvent.

The ratio of the magnetic body in the curable composition of the present application is not particularly limited, which may be selected in consideration of the heat or the like required for curing the relevant curable composition. In one example, the curable composition may comprise the magnetic body in a ratio of 0.01 to 60 parts by weight relative to 100 parts by weight of the curable resin. In another example, the ratio of the magnetic particles may be about 0.5 parts by weight or more, or about 1 part by weight or more, about 3 parts by weight or more, or about 5 parts by weight or more, or may also be about 55 parts by weight or less, about 50 parts by weight or less, about 45 parts by weight or less, about 40 parts by weight or less, about 35 parts by weight or less, about 30 parts by weight or less, about 25 parts by weight or less, about 20 parts by weight or less, about 15 parts by weight or less, or about 10 parts by weight or less or so. In the ratio calculation of the magnetic body, the reference curable resin includes not only resinous components but also components which are not resinous, but are capable of forming resins by curing.

The curable composition may further comprise, in addition to the above-described components, any additive required in the curable composition. Such an additive may be exemplified by a curing agent or a catalyst for assisting curing of the curable resin, an initiator such as a radical initiator or a cationic initiator, a thixotropic agent, a leveling agent, a defoaming agent, an antioxidant, a radical-generating material, organic and inorganic pigments or dyes, a dispersant, various fillers such as a thermally conductive filler or an insulating filler, a functional polymer or a light stabilizer, and the like, but is not limited thereto.

Such a curable composition can be applied to various applications. In particular, as described above, the curable composition of the present application can be effectively cured even in a state of low viscosity to form a cured product having desired physical properties, so that it can be effectively applied to applications to form a cured product having desired physical properties by filling a part having a very narrow or complicated shape.

The application related to such a case can be exemplified by a motor. Accordingly, in one example, the present application may be for an electric motor to which the above-mentioned curable composition or its cured product is applied.

The motor is a device that can obtain rotational force from electric energy, which may comprise, for example, so-called stator and rotor. Here, the rotor is configured to electromagnetically interact with the stator, which can be rotated by force acting between the magnetic field and the current flowing in the coil.

A number of slots may be formed in the stator. Wires are wound around the slot, and as each wire is connected to a lead wire, the power is applied. As the wire wound around the slot, a general winding type wire and a hairpin winding type wire are known. Here, the general winding method is a method in which a number of relatively thin wires are wound around a slot, and this method causes less skin effect at high speed. The hairpin winding method is a method of inserting relatively thick wires into a slot. According to the hairpin winding method, there is no waste of space between the coils, so that the space factor can be maximized and the power improvement can be expected due to resistance reduction.

In any case, after the winding is applied to the slot, the space in the slot needs to be filled with an insulator, where the slot is a space having a narrow opening and a narrow interior, and thus it is a difficult problem to properly fill this space. Particularly, in the case where the winding exists in the inside of the slot, it is not easy to fill it.

However, the curable composition of the present application has fluidity at an appropriate low viscosity to be effectively filled even in a complicated or narrow part, and it can be cured in a state hardly causing curing shrinkage or the like to effectively fill the part, so that it can be effectively applied to such an application (application for filling a slot into which windings are introduced).

Accordingly, the electric motor of the present application may comprise: a stator on which one or more slots are formed; windings present in the slots of the stator; and the curable composition filling the slots or a cured product of the curable composition.

The shape or kind of the stator applied to the electric motor of the present application is not particularly limited. Usually, the stator has a structure including steel plates stacked in a cylindrical shape and formed of a material such as iron (Fe), wherein the slots are arranged radially along the circumferential direction of the stator, but the type of the stator is not limited thereto.

In addition, the shape, size or number of slots formed in the stator can also be changed depending on the use.

Furthermore, in the present application, the type of the winding to be applied is not particularly limited. Usually, the winding is manufactured by performing insulation coating or the like on a material such as copper (Cu), and in the present application, other types of windings as well as such conventional windings can be applied. In addition, as the winding method, all types, such as the above-mentioned general winding method and hairpin winding method, can be applied.

Figure 1:
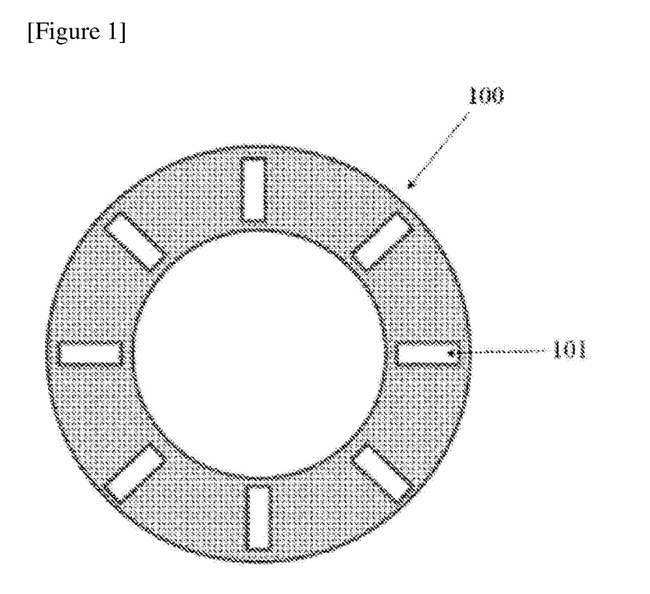
FIGS. 1 and 2 are schematic diagrams of an exemplary stator.
Figure 2:
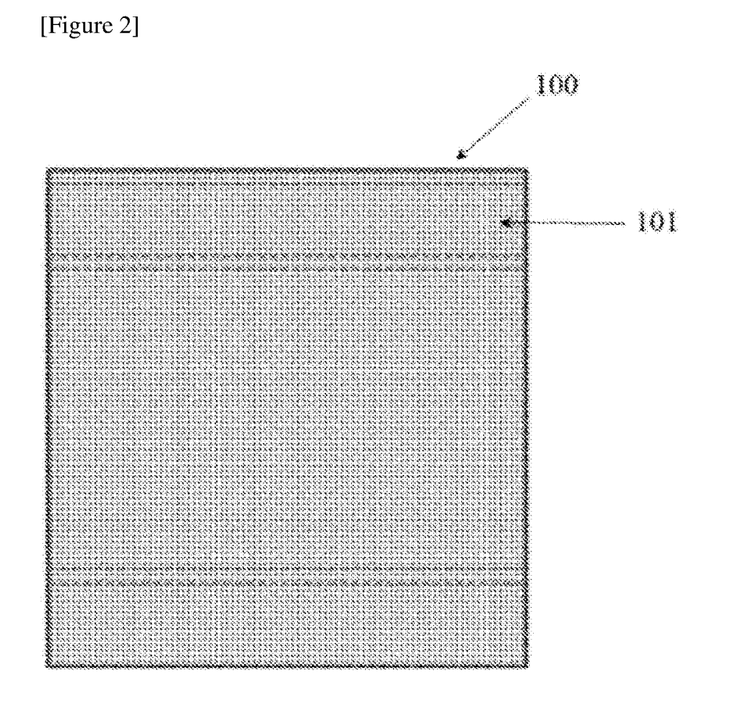
Figure 3:
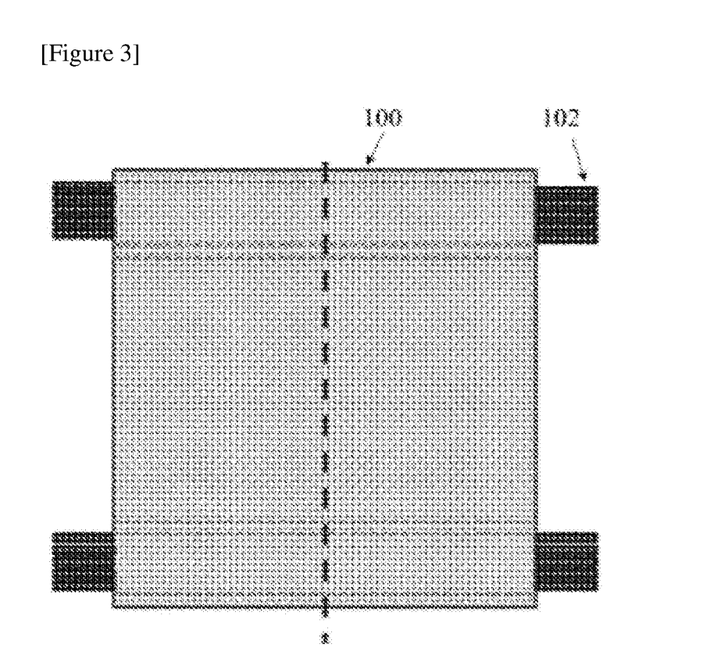
FIG. 3 is a schematic diagram showing a state where a winding is introduced into the stator.

FIGS. 1 and 2 are an exemplary form of the stator (100). The stator illustrated in FIGS. 1 and 2 is the above-mentioned cylindrical stator, where FIG. 1 shows a case where the stator (100) is observed in the direction of the surface in which the slots (101) are formed, and FIG. 2 shows a case where the stator (100) is observed from the side. Also, FIG. 3 is a side view in which the windings (102) are introduced into the slots of the stator (100) as above.

As described above, the shape, size and/or number of slots formed in the stator are determined depending on the use, which are not particularly limited. However, in general, the slot has a narrow opening and a narrow internal space. For example, the area of the opening in the slot is usually in a range of 0.5 to 10 cm$^2$. Also, the length of the slot is usually in a range of about 5 to 30 cm. However, the area and length, and the like of the opening may be changed depending on the type of the motor.

When the curable composition of the present application is applied, it is possible to fill the inside of the slot with an excellent filling rate. For example, in the motor of the present application, the curable composition or the cured product thereof may fill the inside of the slot with a filling rate of 80% or more. In another example, the filling rate may be 81% or more, 82% or more, 83% or more, 84% or more, 85% or more, 86% or more, 87% or more, 88% or more, 89% or more, or 90% or more. The filling rate is the percentage of the volume of the curable composition or the cured product thereof present within the slot relative to the internal volume of the slot, excluding the volume occupied by elements present inside the slot, such as the winding. The higher the numerical value, the more advantageous the filling rate is, and the upper limit is not particularly limited. Illustratively, the filling rate may be 100% or less, 99% or less, 98% or less, 97% or less, 96% or less, 95% or less, 94% or less, or 93% or less or so.

In the electric motor of the present application, as long as the above-mentioned curable composition or its cured product has a shape filling the inside of the slot, all parts of generally known electric motors can be applied as other elements or parts.

Such an electric motor may be manufactured through a step of introducing the curable composition into the slots in the stator that one or more slots, into which windings are introduced, are formed. If necessary, after introducing the curable composition, a step of curing the relevant curable composition may be further performed.

Here, the method of introducing the curable composition into the slots is not particularly limited. That is, according to the present application, the curable composition can be maintained in a state of very low viscosity and good fluidity, and thus the inside of the slot can be filled with the curable composition via an appropriate manner.

Figure 4:
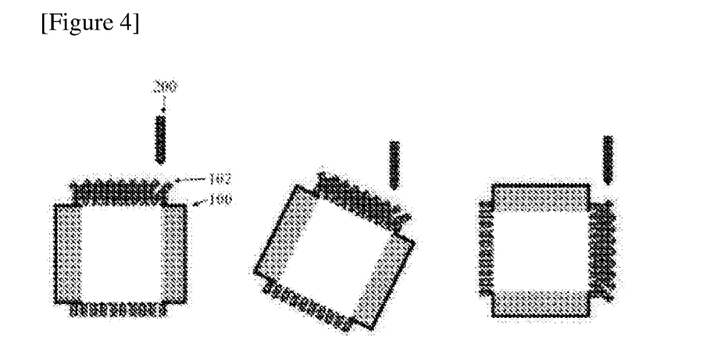
FIG. 4 is a view illustratively showing a process of introducing a curable composition into a slot of a stator to which a winding is introduced.

FIG. 4 is a view showing one exemplary way of filling the inside of a slot with a curable composition. In one example, as in the leftmost portion of the drawing, the curable composition can be introduced by being dropped or dispersed toward the slot, to which the windings (102) are introduced, through an introduction means such as a suitable nozzle (200). To properly fill the introduced curable composition inside the slot, after the introduction of the curable composition, a process of tilting or inclining the stator (100) can also be further performed, as shown in the middle and the rightmost portions of FIG. 4.

After the curable composition is injected through the above-described process, a step of curing it may be further performed. In this case, the method of performing the curing is not particularly limited.

For example, the curing can be performed by an induction heating method.

As described above, since the curable composition comprises a magnetic body, the induction heating method can be applied thereto.

For example, when an alternating magnetic field is applied toward the curable composition in the slot, Joule heat of the vibrational heat of the magnetic body may occur due to the intensity of the applied alternating magnetic field, and a uniform cured product can be formed in a short time by the heat of the particles uniformly dispersed in the composition.

Therefore, the curing process may comprise a step of applying an alternating magnetic field to the curable composition. By the application of the alternating magnetic field, vibrational heat of the magnetic body is generated, whereby the composition can be cured. At this time, the conditions for applying the alternating magnetic field are not particularly limited as they are determined depending on the kind and ratio of the magnetic body in the curable composition, the amount of heat required for curing, and the like. For example, the induction heating can be performed by applying an alternating magnetic field using an induction heater formed in the form of a coil or the like.

The alternating magnetic field may be applied at an intensity in a range of, for example, 0.001 to 0.5 Tesla (Wb/m$^2$). In another example, the magnitude of the applied alternating magnetic field may be 0.45 Tesla or less, 0.4 Tesla or less, 0.35 Tesla or less, 0.3 Tesla or less, 0.25 Tesla or less, or 0.2 Tesla or less. In another example, the intensity of the alternating magnetic field may be about 0.002 Tesla or more, about 0.003 Tesla or more, or about 0.004 Tesla or more.

In one example, the alternating magnetic field may be applied stepwise, or a method of applying a plurality of alternating magnetic fields under different conditions may be applied.

The induction heating can be performed, for example, at a frequency of about 50 kHz to 1,000 kHz. In another example, the frequency may be 900 kHz or less, 800 kHz or less, 700 kHz or less, 600 kHz or less, 500 kHz or less, or 450 kHz or less. In another example, the frequency may be about 70 kHz or more, about 100 kHz or more, about 150 kHz or more, about 200 kHz or more, or about 250 kHz or more.

The application of the alternating electromagnetic field for the induction heating can be performed within a range of, for example, about 5 seconds to 10 hours. In another example, the application time may be about 9 hours or less, about 8 hours or less, about 7 hours or less, about 6 hours or less, about 5 hours or less, about 4 hours or less, about 3 hours or less, about 2 hours or less, about 1 hour or less, about 50 minutes or less, about 40 minutes or less, or about 30 minutes or less, about 20 minutes or less, about 15 minutes or less, about 10 minutes or less, or about 5 minutes or less.

As described above, the above-mentioned induction heating conditions, for example, the applied alternating magnetic field, frequency and application time, and the like can be changed in consideration of the amount of heat required for curing of the curable composition, the kind and ratio of particles, and the like.

The curing of the curable composition may be performed only by the above-mentioned induction heating or, if necessary, may also be performed while applying appropriate heat with the application of the induction heating, i.e. the application of the alternating magnetic field.

Advantageous Effects

The present application can provide a curable composition which can be applied in a state having low viscosity, and fluidity, and then effectively cured without causing curing shrinkage or the like to form a cured product having desired physical properties.

EXPLANATION OF REFERENCE NUMERALS

100: stator
101: slot
102: winding
200: nozzle

MODE FOR INVENTION

Hereinafter, the present application will be described in detail by way of examples and comparative examples, but the scope of the present application is not limited to the following examples.

1. Measurement Method of Viscosity

A viscosity of a curable composition was measured using a Brookfield DV2LV viscometer. Using the viscometer, the viscosity was measured at room temperature by adjusting the rpm to satisfy a condition of a shear rate of 100 s$^{-1}$ using a spindle #16.

2. Evaluation Method of Room-Temperature Stability

Room-temperature stability of a curable composition was confirmed by introducing the curable composition prepared in Example or Comparative Example into a vial of 20 mL in an amount of about 10 mL and then evaluating the time point when phase separation of the magnetic body and the curable resin occurred while keeping the temperature at room temperature. The room-temperature stability was evaluated by evaluating the time point when the phase separation or precipitation of the magnetic body was confirmed visually and confirming the time of the time point.

3. Dielectric Breakdown Strength

Dielectric breakdown strength was evaluated according to ASTM D149 standard for a cured product of a curable composition. The cured product was made into a specimen that the width and height lengths are each 100 mm or so and the thickness is 1 to 3 mm, and the dielectric breakdown strength was measured according to the standard and then converted to the dielectric breakdown strength per unit thickness.

4. Evaluation of Hardness

A cured product of a curable composition was molded into a specimen that the width and height lengths are each 100 mm or so and the thickness is 12 mm or so, and hardness was measured with a durometer according to ASTM D2240 standard.

5. Evaluation of Filling Rate

After a cured product of a curable composition was formed inside the slot of the stator, into which the windings were introduced, by the method described in Examples or Comparative Examples, the stator was cut to check the amount of the cured product filled in the slot, and then the percentage of the volume of the cured product was obtained relative to the entire slot internal volume, thereby determining a filling rate.

Production Example 1. Magnetic Particles (A)

As magnetic particles (A), $MnOFe_2O_3$ particles were applied. The magnetic particles (A) had an average particle size of about 100 nm, a coercive force of about 94 kOe and a saturation magnetization value of about 80 emu/g or so when measured by FESEM (field effect scanning electron microscope) and DLS (dynamic light scattering). Here, the coercive force and the saturation magnetization value were measured under an external magnetic field of 1 Tesla to a vibrating sample magnetometer (SQUID-VSM, Korea Basic Science Institute) using an H-S curve (VSM curve).

Production Example 2. Production of Magnetic Body (A)

The magnetic body (A) subjected to the surface treatment of the magnetic particles of Production Example 1 was produced in the following manner. As the surface treatment agent, a surface treatment agent (BYK-180) having an acid value of about 94 mgKOH/g and an amine value of about 94 mgKOH/g was applied. The surface-treated magnetic body (A) was produced by uniformly mixing the magnetic particles (A) of Production Example 1 and the surface treatment agent in a weight ratio of 100:10 (magnetic particles:surface treatment agent) using a planetary mixer.

Production Example 3. Production of Magnetic Body (B)

The magnetic body (A) of Production Example 2 was further surface-treated to produce a magnetic body (B). At this time, as the additional surface treatment agent, a mixture of poly(urethane-urea) having an amine value of about 25 mgKOH/g and a molecular weight (Mw) of about 20,000 and polyurethane with a molecular weight (Mw) of about 20,000 or so formed by urethane reaction of HMDI (hexamethylene diisocyanate) and PG (polypropylene glycol) (mixing ratio:about 1:3 (poly(urethane-urea):polyurethane)) was used. The used poly(urethane-urea) included hexamethylene diisocyanate as a diisocyanate compound, propylene diamine as a polyamine and ethylene glycol as a polyol in a weight ratio of 1:5:4 (diisocyanate:polyamine:polyol). The magnetic body (B) was produced by uniformly mixing the magnetic body (A) produced in Production Example 2 and the surface treatment agent in a weight ratio of 100:0.5 (magnetic body (A):surface treatment agent) using a planetary mixer.

Production Example 4. Production of Magnetic Body (C)

The magnetic particles of Production Example 1 and a surface treatment agent (BYK-220S) having an acid value of 100 mgKOH/g or so were uniformly mixed with a planetary mixer in a weight ratio of 100:5 (magnetic particles:surface treatment agent) to produce a primary surface-treated magnetic body. The mixing was performed by blending the magnetic body and the surface treatment agent so that the concentration of the magnetic particles in the epoxy resin applied in Example 3 was about 5 weight %. Subsequently, a branched polyester-based surface treatment agent (hyperbranched polyester) (BYK-2152) and the primary surface-treated magnetic body were uniformly mixed with a planetary mixer in a weight ratio of about 10:1 (magnetic body:BYK-2152) to produce a magnetic body (C).

Example 1

The curable polyester imide having a room-temperature viscosity (condition of shear rate of 100 $s^{-1}$) of about 4,000 to 6,000 cP as measured by the above method and a temperature index of 180° C., the magnetic body (A) of Production Example 2 and a leveling agent (BYK 333) were mixed to prepare a curable composition. Here, the ratio of the magnetic body in the curable composition was about 5 weight %, and the ratio of the leveling agent in the curable composition was about 0.5 weight %. The viscosity of the prepared curable composition was about 4,530 cP or so (shear rate 100 $s^{-1}$) at room temperature. The relevant curable composition was coated in a film form (thickness: about 2 mm) and the curing by induction heating was performed by applying an alternating magnetic field. The alternating magnetic field was applied for 2 minutes so that the applied alternating magnetic field intensity was about 25 mT or so, and the frequency at the time of applying the alternating magnetic field was about 340 kHz or so. The application of the alternating magnetic field was performed using a coil from AMBRELL (AMBRELL, EASY HEAT 820, φ 30 mm, 3 turns solenoid type coil).

On the other hand, as shown in FIG. 1, a cylindrical stator was prepared. The slots were formed radially in the stator, as shown in FIG. 1, and the openings were in the form of rectangles having a width of about 5 mm or so and a length of about 20 mm or so. Windings (102) (copper wires) were introduced into the slot, as shown in FIG. 3. As the windings, those having a circular cross section having a diameter of 4.5 mm or so were used, and 5 relevant windings were introduced into one slot. Then, the curable composition was injected into the slot in the manner shown at the leftmost portion of FIG. 4 and the curable composition was filled inside the slot by tilting the stator as in the middle and rightmost views of FIG. 4. Subsequently, the curable composition was cured in the same manner as described above and the filling rate was evaluated. At the time of evaluating the filling rate, the stator was cut in a direction perpendicular to the longitudinal direction, and a portion where the cured product of the curable composition was present was confirmed using a UV lamp, whereby the filling rate of the cured product was obtained.

Example 2

A curable composition was prepared in the same manner as in Example 1, except that the magnetic body (B) of Production Example 3 was applied as the magnetic body. The viscosity of the prepared curable composition was about 4,810 cP or so (shear rate 100 $s^{-1}$) at room temperature. A specimen and a stator were prepared in the same manner as in Example 1 using this curable composition, and applied to the evaluation. However, in the case of Example 2, the application time of the alternating magnetic field was adjusted to a level of about 90 seconds.

Example 3

A curable epoxy resin (manufactured by Kukdo Chemical Co., Ltd., room-temperature viscosity: 10,000 cP, epoxy equivalent 200, bisphenol A type epoxy resin), the magnetic body (C) of Production Example 3 and a cationic initiator (manufactured by Samsin Chemical Co., Ltd., B2A) were mixed to prepare a curable composition. Here, the ratio of the magnetic body in the curable composition was about 5 weight %, and the ratio of the cationic initiator in the curable composition was about 0.2 weight %. The viscosity of the prepared curable composition was about 6,100 cP or so (shear rate 100 s$^{-1}$) at room temperature. A specimen and a stator were prepared in the same manner as in Example 1 using this curable composition, and applied to the evaluation. However, in the case of Example 3, the application time of the alternating magnetic field was adjusted to a level of about 80 seconds.

Comparative Example 1

A curable composition was prepared in the same manner as in Example 1, except that the magnetic particles (A) of Production Example 1 were applied. The viscosity of the prepared curable composition was about 4,340 cP or so (shear rate 100 s$^{-1}$) at room temperature. A specimen and a stator were prepared in the same manner as in Example 1 using this curable composition, and applied to the evaluation. However, in Comparative Example 1, the application time of the alternating magnetic field was adjusted to about 3 minutes or so.

Comparative Example 2

A curable composition was prepared in the same manner as in Example 3, except that the magnetic particles (A) of Production Example 1 were applied. The viscosity of the prepared curable composition was about 6,800 cP or so (shear rate 100 s$^{-1}$) at room temperature. A specimen and a stator were prepared in the same manner as in Example 1 using this curable composition, and applied to the evaluation.

The evaluation results of the respective examples and comparative examples were summarized and described in Table 1 below.

TABLE 1

|  |  | Room-temperature stability | Dielectric breakdown strength | Hardness | Filling rate |
|---|---|---|---|---|---|
| Example | 1 | 96 hours | 20 kV/mm | 87 | 89% |
|  | 2 | 480 hours | 20 kV/mm | 87 | 92% |
|  | 3 | 360 hours | 20 kV/mm | 91 | 86% |
| Comparative Example | 1 | 72 hours | 19 kV/mm | 85 | 79% |
|  | 2 | 96 hours | 19 kV/mm | 90 | 74% |

From the results of Table 1, the curable composition of the examples exhibited extraordinarily excellent room-temperature stability and filling rates as compared with the comparative examples. Also, in the case of the comparative examples, it could be confirmed that the partially phase-separated portions were visually observed even in the cured products, and other physical properties were also poor.

The invention claimed is:

1. A curable composition, comprising:
   a curable resin and
   a magnetic body,
   wherein the magnetic body comprises magnetic particles and a surface treatment agent present on a surface of the magnetic particles,
   wherein the surface treatment agent has an acid value in a range of 10 to 400 mg KOH/g, or an amine value in a range of 5 to 400 mg KOH/g.

2. The curable composition according to claim 1, wherein the curable composition has a room-temperature viscosity of 10,000 cP or less at a shear rate of 100 s$^{-1}$.

3. The curable composition according to claim 1, wherein the curable composition has dielectric breakdown strength of 10 kV/mm or more, or the curable composition is configured to form a cured product having dielectric breakdown strength of 10 kV/mm or more.

4. The curable composition according to claim 1, wherein the curable resin comprises an alkenyl group, an acryloyl group, a methacryloyl group, an epoxy group, an oxetane group, an alkenyl group, a hydrogen atom bonded to a silicon atom, an isocyanate group, a hydroxyl group, a phthalonitrile group or a carboxyl group.

5. The curable composition according to claim 1, wherein the curable resin is a polysilicone resin, polyimide, polyether imide, polyester imide, an acrylic resin, a vinyl resin, an olefin resin, a polyurethane resin, an isocyanate resin, an acrylic resin, a polyester resin, a phthalonitrile resin, polyamic acid, polyamide or an epoxy resin.

6. The curable composition according to claim 1, wherein the magnetic particles are multi-domain type magnetic particles.

7. The curable composition according to claim 1, wherein the surface treatment agent is a polyol-based compound, a polysiloxane-based compound, an alkyl phosphoric acid-based surface treatment agent, an alkylcarboxylic acid-based surface treatment agent, an alkyl sulfonic acid-based surface treatment agent, an acid compound containing a long-chain alkyl group, an acrylic copolymer containing an acidic functional group or an amino group, an aromatic acid-based surface treatment agent or a block copolymer containing an acidic functional group or an amino group.

8. The curable composition according to claim 1, wherein the magnetic body comprises 0.01 to 30 parts by weight of the surface treatment agent relative to 100 parts by weight of the magnetic particles.

9. The curable composition according to claim 1, wherein the magnetic body further comprises a secondary surface treatment agent bonded to the surface treatment agent.

10. The curable composition according to claim 9, wherein the secondary surface treatment agent is a polyurethane-based surface treatment agent, a polyurea-based surface treatment agent, a poly(urethane-urea)-based surface treatment agent compound or a branched polyester-based surface treatment agent.

11. The curable composition according to claim 9, wherein the magnetic body comprises 0.01 to 30 parts by weight of the secondary surface treatment agent relative to 100 parts by weight of the magnetic particles.

12. The curable composition according to claim 1, comprising 0.01 to 60 parts by weight of the magnetic body relative to 100 parts by weight of the curable resin.

13. An electric motor, comprising:
   a stator in which one or more slots are formed;
   windings present in the slots of the stator; and
   a cured product of the curable composition of claim 1,
   wherein the cured product is present in the slots.

14. The electric motor according to claim 13, wherein the slot has an opening area in a range of 0.5 to 10 cm$^2$.

15. A method for manufacturing an electric motor, comprising:
- introducing the curable composition of claim 1 into one or more slots into which windings are introduced, the slots being formed in a stator; and
- applying an alternating magnetic field capable of induction heating of the magnetic body in the curable composition.

16. The curable composition of claim 1, wherein the magnetic particle has a coercive force in a range of 1 kOe to 200 kOe.

17. The curable composition of claim 1, wherein the magnetic particles have a saturation magnetization value at room temperature of 20 emu/g to 150 emu/g.

18. The curable composition of claim 1, wherein the magnetic particles have an average particle size of ranging from 20 nm to 300 nm.

* * * * *